United States Patent [19]

Ishii

[11] Patent Number: 4,758,914
[45] Date of Patent: Jul. 19, 1988

[54] SYSTEM FOR PROTECTING NEWLY INSTALLED DISK UNITS

[75] Inventor: Kazunori Ishii, Yokohama, Japan

[73] Assignee: Alps Electric Co., Ltd., Japan

[21] Appl. No.: 939,901

[22] Filed: Dec. 9, 1986

[30] Foreign Application Priority Data

Jan. 18, 1986 [JP] Japan .................................. 61-8550

[51] Int. Cl.[4] ........................ G11B 5/54; G11B 21/12; G06F 13/10
[52] U.S. Cl. ...................................... 360/75; 360/105
[58] Field of Search ................ 360/75, 78, 105; 371/66; 364/200 MS File, 900 MS File

[56] References Cited

U.S. PATENT DOCUMENTS

| | | | |
|---|---|---|---|
| 4,041,469 | 8/1977 | Jennings | 364/900 |
| 4,237,501 | 12/1980 | Barmache et al. | 360/105 |
| 4,566,046 | 1/1986 | Fujiki et al. | 360/75 |
| 4,679,102 | 7/1987 | Wevers et al. | 360/75 |

FOREIGN PATENT DOCUMENTS 60-238919 11/1985 Japan .
60-225922 11/1985 Japan .

Primary Examiner—Raymond F. Cardillo
Assistant Examiner—David L. Robertson
Attorney, Agent, or Firm—Guy W. Shoup; Leighton K. Chong

[57] ABSTRACT

A fixed disk protection system for causing a head to seek for a CSS (contact-start-stop) zone at the time of power breaking is provided, which comprises a CSS zone discriminating section for receiving the type information of a fixed disk unit from a central processing unit and discriminating the position of the CSS zone at the time of power making, a power breaking request signal detecting section for detecting a power breaking request signal given from a power supply at the time of power breaking, a head seek commanding section for referring to a CSS zone memory section and issuing a command of causing the head to seek for the given CSS zone after the power breaking request signal has been detected, and a power breaking commanding section for sending a power breaking signal to the power supply after seeking for the given CSS zone has been terminated, whereby different types of fixed disks can be handled by causing the head to seek for the given CSS zone on the basis of the discriminated results of the CSS zone discriminating section.

4 Claims, 2 Drawing Sheets

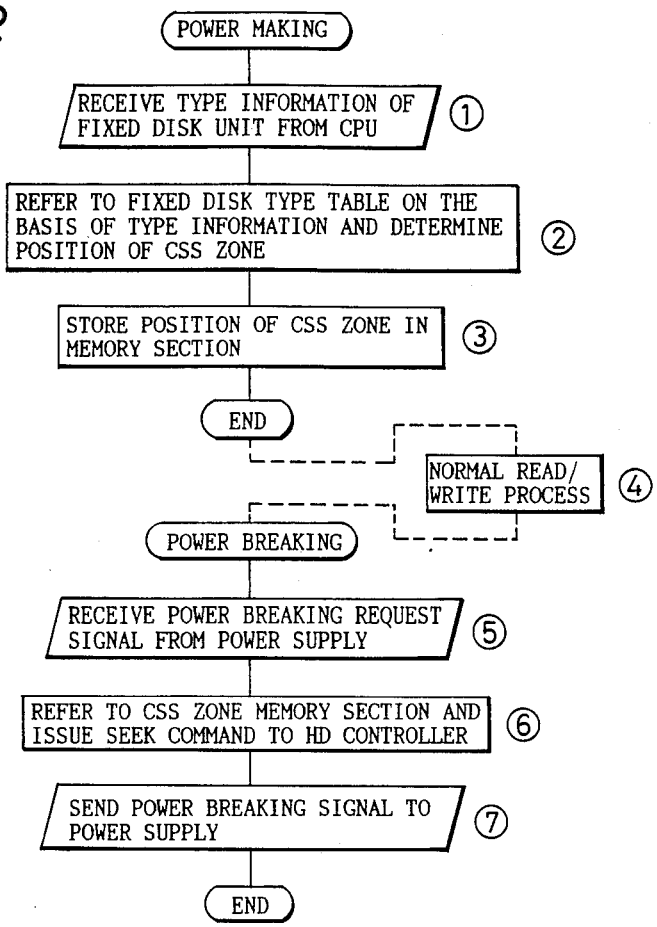

SYSTEM FOR PROTECTING NEWLY INSTALLED DISK UNITS

BACKGROUND OF THE INVENTION

1. Field of the Invention

This invention relates to a protection system for fixed disks.

2. Description of the Prior Art

Fixed disk units are classified into several types depending upon the number of heads, cylinders, etc. Because fixed disk units of different types have a CSS zone (contact start-stop zone) at different positions thereon, the disk units must be controlled in correspondingly different manners. In view of the foregoing, hitherto a system adapted to incorporate fixed disk units of different types possessed no capability of protecting a fixed disk and when necessary (for example, at the time of carrying), had to make a head take refuge in the CSS zone by means of a program used exclusively for that purpose.

The conventional apparatus is fixedly set so as to perform protective control harmonization with a predetermined type of fixed disk unit. Hence, the problem existed that fixed disk units of the type compatible with the incorporated control had to be used. On the other hand, one may propose the idea of performing protective control by means of a program exclusively used for handling each type of fixed disk unit. However, this idea is very troublesome because it must be performed by an operator when necessary.

SUMMARY OF THE INVENTION

It is an object of the present invention to provide a fixed disk protection system capable of handling different types of fixed disk units.

To achieve the foregoing object, the present invention provides a novel fixed disk protection system which operates by performing the steps of (1) receiving from a CPU the type information of a fixed disk unit which has been incorporated, (2) discriminating the position of a CSS zone of the fixed disk unit incorporated in dependence on the type information received, (3) storing the discriminated position of the CSS zone in a predetermined memory area, and (4) referring to the predetermined memory area at the time of power breaking and causing a head to search for the recognized position of the CSS zone.

BRIEF DESCRIPTION OF THE DRAWINGS

FIG. 2 is a flowchart explanatory of the operation of the present invention; and FIG. 3 is a configuration diagram showing an example of a fixed disk type table.

DESCRIPTION OF THE PREFERRED EMBODIMENT

Figure 1:
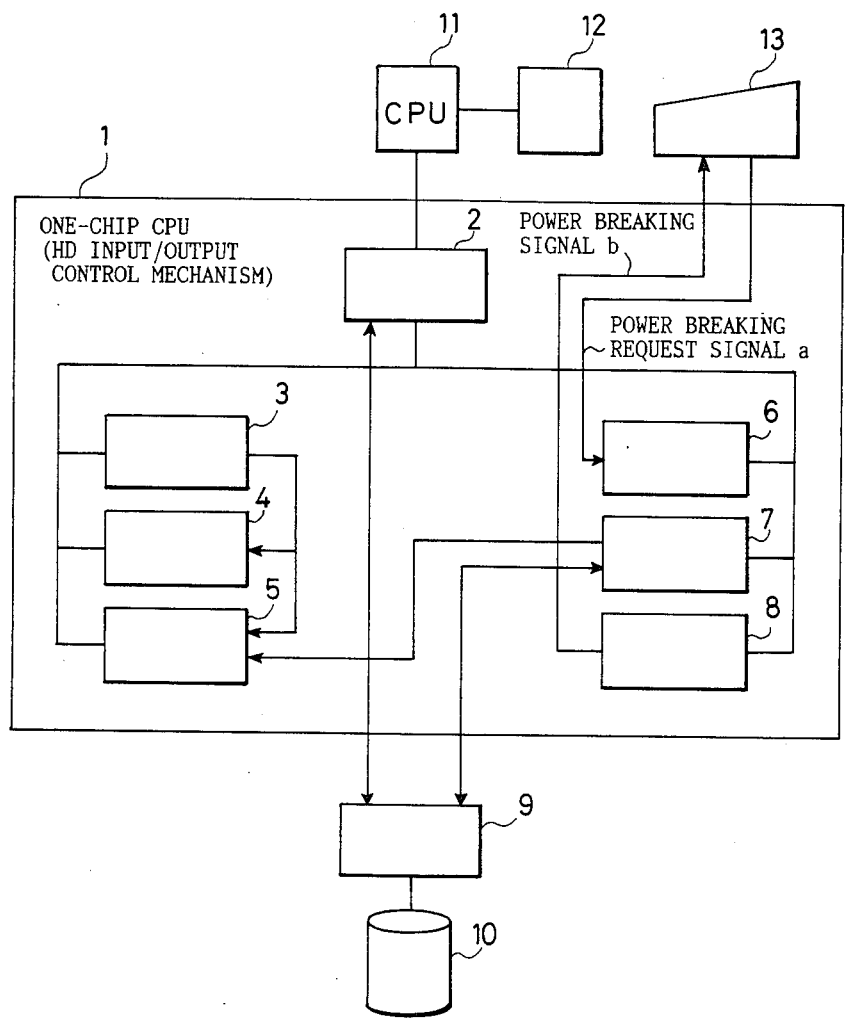
FIG. 1 is a block diagram showing an embodiment of the present invention.

One preferred embodiment of the present invention will now be described with reference to FIG. 1. In this drawing, reference numeral 1 indicates a one-chip CPU (a fixed disk input/output control mechanism), 2 indicates a control section, 3 indicates a CSS zone discriminating section, 4 indicates a fixed disk type table, 5 indicates a CSS zone memory section, 6 indicates a power breaking request signal detecting section, 7 indicates a head seek commanding section, 8 indicates a power breaking commanding section, 9 indicates a fixed disk controller, 10 indicates a fixed disk unit, 11 indicates a CPU (a central processing unit), 12 indicates a main memory unit, and 13 a power supply.

As shown in FIG. 1, the one-chip CPU 1 is composed of the control section 2, CSS zone discriminating section 3, fixed disk type table 4, CSS zone memory section 5, power breaking request signal detecting section 6, head seek commanding section 7, and power breaking commanding section 8.

The CSS zone discriminating section 3 is adapted in dependence on the type information of the fixed disk unit 10 received from the CPU 11 at the time of power start-up, to refer to the fixed disk type table 4 and to discriminate the position of a CSS (contact-start-stop) zone of that fixed disk unit 10.

The fixed disk type table 4 holds pairs of type information (largest cylinder number, largest head number) indicative of types of various fixed disks and position information (for example, a cylinder number "615" if the largest cylinder number is 615 and the largest head number is 4) indicative of positions of CSS zones corresponding to the types of fixed disks. The number of pairs equals the number of types of fixed disk units 10 incorporatable into the system.

The CSS zone memory section 5 is adapted to store therein information representing the position of the CSS zone discriminated by the CSS zone discriminating section 3.

The power breaking request signal detecting section 6 is adapted to detect a power breaking request signal a output from the power supply 13.

The head seek commanding section 7 is adapted to refer to the CSS zone memory section 5 after the request signal a has been detected by the power breaking request signal detecting section 6 and to issue a command to the fixed disk controller (hereinafter "HD controller") 9 which initiates a search for the recognized position of the CSS zone, for example, the position of cylinder number 615.

The power breaking commanding section 8 is adapted to issue a power breaking signal b to the power supply 13 after completion of the search for the CSS zone initiated by the head seek commanding section 7. The power is actually turned off in response to this power breaking signal b.

The operation of the foregoing system will now be described. In the configuration shown in FIG. 1, if a new type of fixed disk unit 10 is connected to the HD controller 9, the one-chip CPU 1 operates, at the time of power making, to discriminate the position of the CSS zone of the fixed disk unit 10 and store the position information in the CSS zone memory section 5 in the manner described below.

First, the CSS zone discriminating section 3 receives the type information of the fixed disk unit 10 from the CPU 11.

Second, the CSS zone discriminating section 3 refers to the fixed disk type table 4 in dependence on the type information of the fixed disk unit 10 and discriminates the position of the CSS zone.

Third, the CSS zone discriminating section 3 stores information representing the discriminated position of the CSS zone in the CSS zone memory section 5. Using the information thus stored, the head is caused to search for the CSS zone at the time of power breaking.

In the embodiment shown in FIG. 1, the one-chip CPU 1 discriminates the position of the CSS zone of the fixed disk unit 10, stores information representing that position in the CSS zone memory section 5, refers to the CSS zone memory section 5 at the time of power breaking, and causes the head to search for that position. Further, CPU 1 sends predetermined control signals or the like to HD controller 9 in response to an access request or the like received from CPU 11.

The main memory unit 12 has stored therein programs for controlling CPU 11, data, etc. When a power switch is turned off, the power supply 13 sends the power breaking request signal a to detecting section 6, thereby indicating to CPU 1 that the switch has been turned off, and receives the power breaking signal b from CPU 1 permitting power breaking, thereby cutting off the supply of power.

The operation of the embodiment shown in FIG. 1 will now be described in greater detail with reference to the flowchart of FIG. 2.

In FIG. 2, symbol (1) indicates the step of receiving the type information of the fixed disk unit 10 from the CPU 11. The CSS zone discriminating section 3 receives from CPU 11 the type information of the fixed disk unit 10 which has been incorporated. The type information consists of the largest cylinder number and the largest head number of the fixed disk unit 10 incorporated, for examble, the largest cylinder number is 615 and the largest head number is 4.

Symbol (2) indicates the step of referring to the fixed disk type table 4, such as the table shown in FIG. 3, in dependence on the received type information and discriminating the position of the CSS zone. The CSS zone discriminating section 3 refers to the fixed disk type table 4 in dependence on the type information and discriminates the position of the CSS zone.

Symbol (3) indicates the step of storing information representing the discriminated position of the CSS zone. The CSS zone discriminating section 3 stores the discriminated position of the CSS zone in the CSS zone memory section 5. Steps (1) through (3) are executed when the power supply 13 is connected.

Symbol (4) indicates the step of executing a normal READ/WRITE process.

Symbol (5) indicates the step of receiving the power breaking request signal a from the power supply 13. The power breaking request signal detecting section 6 detects the power breaking request signal a output from the power supply 13.

Symbol (6) indicates the step of causing the head mounted on the fixed disk unit 10 to search for the CSS zone. The head seek commanding section 7 refers to the CSS zone memory section 5 and sends a command to the HD controller 9 which causes the head to search for the recognized position of the CSS zone.

Symbol (7) indicates the step of sending the power breaking signal b to the power supply 13. The supply of power is cutoff in response to receipt by the power supply 13 of a power breaking signal b from the power breaking commanding section.

As described hereinabove, the system of the present invention (1) receives from the CPU the type information of the fixed disk unit which has been incorporated, (2) discriminates the position of the CSS zone of the fixed disk unit incorporated in dependence on the type information received, (3) stores the discriminated position of the CSS zone in a predetermined memory area, and (4) refers to the predetermined memory area at the time of power breaking and causes the head to search for the recognized position of the CSS zone. Therefore, even when a new type of fixed disk unit is incorporated, disk protective control harmonization with this new type of disk unit can be achieved each time the power is cutoff.

What is claimed is:

1. A fixed disk protection system for causing a head to seek for a CSS (contact-start-stop) zone at the time of power breaking, comprising:
    a CSS zone discriminating section for receiving the type information of a fixed disk unit from a central processing unit and discriminating the position of the CSS zone at the time of power making,
    a power breaking request signal detecting section for detecting a power breaking request signal given from a power supply at the time of power breaking,
    a head seek commanding section for referring to a CSS zone memory section and issuing a command of causing the head to seek for the given CSS zone after the power breaking request signal has been detected, and
    a power breaking commanding section for sending a power breaking signal to the power supply after seeking for the given CSS zone has been terminated,
    whereby different types of fixed disks can be handled by causing the head to seek for the given CSS zone on the basis of the discriminated results of said CSS zone discriminating section.

2. A fixed disk protection system according to claim 1, wherein said CSS zone discriminating section refers to a fixed disk type table to discriminate the position of the CSS zone of the fixed disk unit incorporated.

3. A fixed disk protection system according to claim 2, wherein said fixed disk type table holds pairs of type information indicative of types of various fixed disks and position information indicative of CSS zones corresponding to the former.

4. A fixed disk protection system according to claim 1 wherein said CSS zone memory section stores therein the position of the CSS zone discriminated by said CSS zone discriminating section.

* * * * *